(12) United States Patent
Egloff et al.

(10) Patent No.: US 6,437,318 B1
(45) Date of Patent: Aug. 20, 2002

(54) ENCODER USING POLARIZED FILTERS

(75) Inventors: Olivier Egloff, Le Mont; Olivier Campiche, Pully, both of (CH)

(73) Assignee: Logitech, Inc., Fremont, CA (US)

(*) Notice: Subject to any disclaimer, the term of this patent is extended or adjusted under 35 U.S.C. 154(b) by 0 days.

(21) Appl. No.: 09/243,922

(22) Filed: Feb. 3, 1999

(51) Int. Cl.[7] .................. H01J 40/14; G01D 5/34; G09G 5/08
(52) U.S. Cl. ............. 250/225; 250/231.18; 250/231.14; 250/231.13; 345/161; 345/165
(58) Field of Search .................. 250/231.13, 231.14, 250/231.16, 231.18, 225; 345/161, 165

(56) References Cited

U.S. PATENT DOCUMENTS

| | | | |
|---|---|---|---|
| 2,998,746 A | | 9/1961 | Gievers |
| 3,306,159 A | | 2/1967 | Beall, Jr. et al. |
| 3,521,071 A | | 7/1970 | Speller |
| 3,877,816 A | * | 4/1975 | Weiss et al. ................. 250/225 |
| 4,958,071 A | * | 9/1990 | Scott-Jackson et al. 250/231.16 |
| 5,389,780 A | * | 2/1995 | Anderson .................... 250/225 |
| 5,424,535 A | * | 6/1995 | Albion et al. ............... 250/225 |
| 5,796,387 A | * | 8/1998 | Curran et al. ............... 345/157 |

* cited by examiner

Primary Examiner—Frank G. Font
Assistant Examiner—Zandra V. Smith
(74) Attorney, Agent, or Firm—Townsend & Townsend & Crew LLP

(57) ABSTRACT

An encoder having a movable element with a first polarized filter coupled to the movable element. A second polarized filter is either stationary, or moves differently from the first polarized filter. A photo-emitter and photodetector are arranged on opposite sides of the two polarized filters. Thus, when the polarized filters are aligned in phase, a maximum amount of light will penetrate to the photodetector. However, as they become out of phase due to movement of one of the filters, the amount of light will decrease, as a function of the amount of movement.

7 Claims, 3 Drawing Sheets

ENCODER USING POLARIZED FILTERS

BACKGROUND OF THE INVENTION

The present invention relates generally to encoders for input devices such as mice, trackballs and joysticks, and more particularly to optical rotary encoders for such devices.

A mouse or trackball typically has a shaft biased against the ball. The shaft rotates when the ball is moved. Two shafts are typically used, one each in the X and Y directions. The shaft is connected to a circular wheel with a number of slots. On one side of the wheel is mounted an LED, and on the other side a photodetector. Thus, as the wheel turns and the slots move, the amount of light impinging on the photodetector is modulated, enabling detection of the amount of movement of the ball in that direction.

A similar mechanism may be applied to a joystick for optical detection, although most joysticks use carbon potentiometers for other electromagnetic sensors. One example of an optical joystick with a moveable shutter is set forth in U.S. Pat. No. 4,607,159. An example using a film with alternating transparent and opaque strips is set forth in U.S. Pat. No. 4,958,071.

SUMMARY OF THE INVENTION

The present invention provides an encoder having a movable element with a first polarized filter coupled to the movable element. A second polarized filter is either stationary, or moves differently from the first polarized filter. A photo-emitter and photodetector are arranged on opposite sides of the two polarized filters. Thus, when the polarized filters are aligned in phase, a maximum amount of light will penetrate to the photodetector. However, as they become out of phase due to movement of one of the filters, the amount of light will decrease, as a function of the amount of movement.

In one embodiment, the encoder is a rotary element which rotates responsive to the movement of an element in an input device. The element could be the ball of a mouse or trackball, a roller wheel in a mouse, or a joystick, for example.

In one embodiment, a differential detection can be provided which eliminates variations due to temperature or other disturbances. In this embodiment, two stationary filters are used, each out of phase with the other, preferably by 90°. Two photodetectors are used, one for each of the stationary polarized filters. The signals from the two photodetectors are differentially detected to provide a signal which is independent of different biases, such as temperature, non-linearity, component tolerances, etc.

For a further understanding of the nature and advantages of the invention, reference should be made to the following description taken in conjunction with the accompanying drawings.

DESCRIPTION OF THE SPECIFIC EMBODIMENTS

The present invention relies on the phenomena of polarized light. An example of polarized light is light from a rainbow, which is completely polarized. If one looks at a rainbow with polarizing sunglasses, one will discover that with such glasses, the light from a section of the rainbow is extinguished. If two polarizing devices, such as two polarizing sunglasses, are placed one in front of the other with their polarization axes in parallel, the combination is transparent to visible light. On the other hand, if the polarization axes are orthogonal to each other (in the same plane), then the combination is opaque to visible light. One commercially available linear polarizing device is the Polaroid sheet polarizer or film, which can easily be purchased in square meters from vendors.

Figure 1:
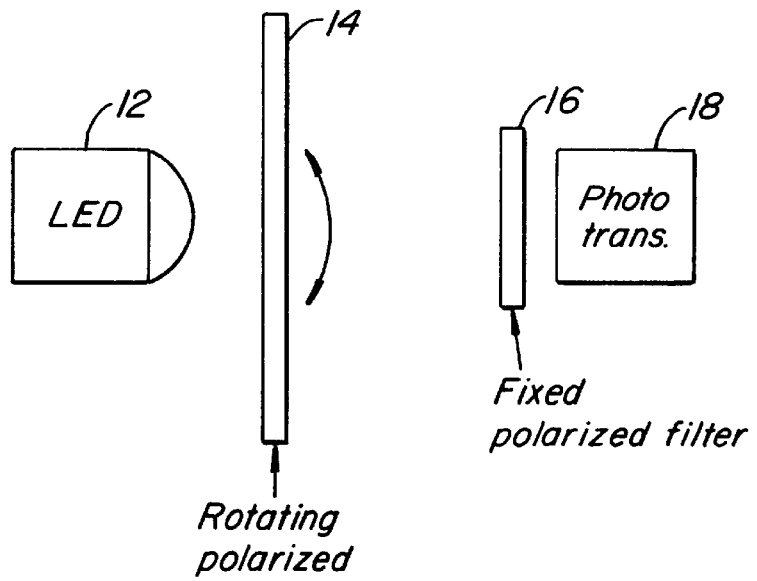
FIG. 1 is a diagram illustrating the elements of one embodiment of the invention.

FIG. 1 illustrates one embodiment of the invention. A photo-emitter or light emitting diode (LED) 12 shines light first through a rotating polarizer 14, and then through a fixed polarized filter 16, with the light which makes it through both filters impinging on a photo-transistor or photodetector 18. Just as described above for the sunglasses, when the two filters 14 and 16 are aligned with their transmitting axes in parallel, the maximum amount of light gets through from the LED 12 to the photo-transistor 18. As polarized filter 14 rotates (in the same plane), less and less light gets through until the minimum amount of light is reached when its transmit axis is orthogonal to that of polarized filter 16. If polarized filter 14 continues to rotate beyond 90°, the amount of light again begins to increase. As can be seen, by connecting polarized filter 14 to a movable element or rotating portion of an input device, the movement can be detected.

Figure 2:
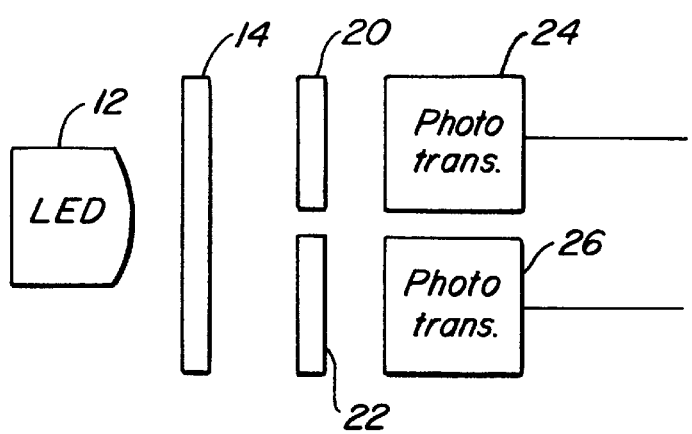
FIG. 2 is a diagram illustrating a differential version of the invention.

FIG. 2 illustrates another embodiment of the invention in which two fixed polarized filters 20 and 22 are used in place of the single polarized filter 16 of FIG. 1. In addition, two photo-transistors 24 and 26 are used. If fixed polarized filters 20 and 22 are arranged to be 90° out of phase, one will be light when the other is dark, and vice versa. As polarized filter 14 rotates, the amount of light impinging on one photo-transistor will decrease, while the amount of light on the other photo-transistor will increase. The two photo-transistors are connected to a differential detector.

Figure 3:
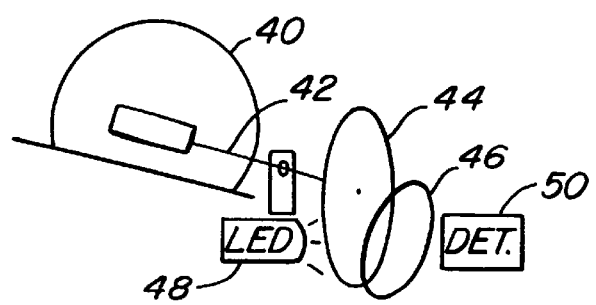
FIG. 3 is a diagram illustrating the use of the invention in a trackball or mouse.

FIG. 3 illustrates a ball 40 used in a trackball or mouse, with a rotating shaft 42 biased against it. At the end of the shaft is an encoder wheel 44. However, instead of using an encoder wheel with slots as in the prior art, this encoder wheel is a polarizing filter which rotates. A second polarizing filter 46 is stationary, and could also be circular, square-shaped or any other shape. In addition, the second polarizing filter 46 only need be opposite a portion of rotating filter 44 in between an LED 48 and photodetector 50 (and thus can be smaller). A similar encoder wheel could be embodied in a roller wheel on a mouse used for scrolling, or it could be attached to a shaft to such a roller wheel on a mouse.

Figure 4:
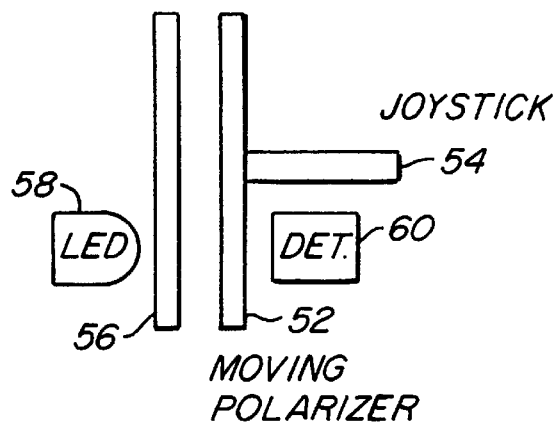
FIG. 4 is a diagram of an embodiment of the invention showing connection to a joystick handle.

FIG. 4 illustrates an embodiment in which the rotating filter 52 is connected to the bottom of a joystick 54. In this embodiment, the stationary polarizer 56 is closer to LED 58 than to photodetector 60. Either position could be used in any embodiment.

Figure 5A:
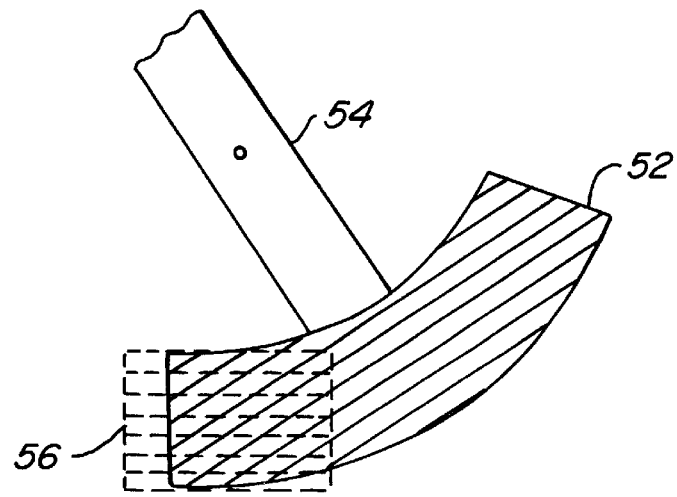
FIGS. 5A and 5B are diagrams illustrating the movement of a joystick handle such as shown in FIG. 4.
Figure 5B:
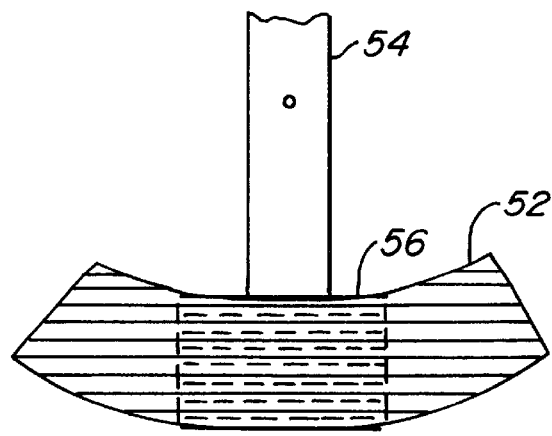

FIGS. 5A and 5B are diagrams intended to illustrate the operation of a moving polarizer as shown in FIG. 4. As shown, the stationary polarizer 56 has a number of dotted lines for graphically illustrating the polarization axes of the polarizing filter. The second, moving polarizer 52 has solid lines corresponding to its polarization axes. As can be seen, in the off-center position of FIG. 5A, the lines are not parallel, while in the unmoved, upright position of FIG. 5B, the lines are parallel. Also note that the moving polarizer 52 can be a curved-shaped cutout of a sheet polarizer.

Figure 6A:
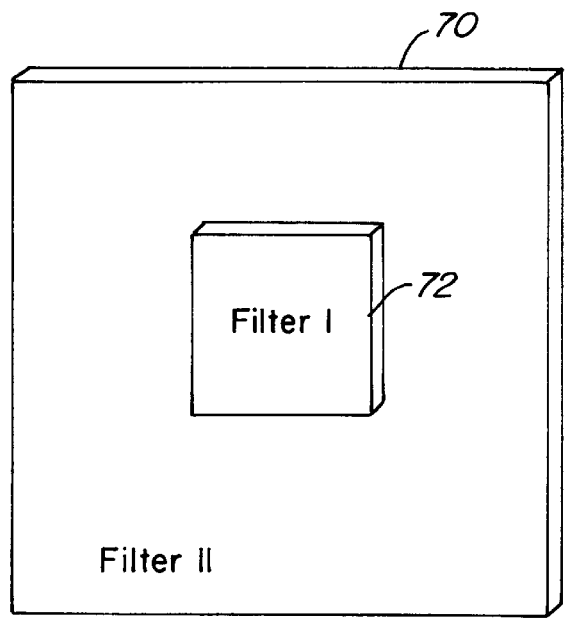
FIGS. 6A–6C are diagrams illustrating the variation in light corresponding to different rotations of a filter.
Figure 6B:
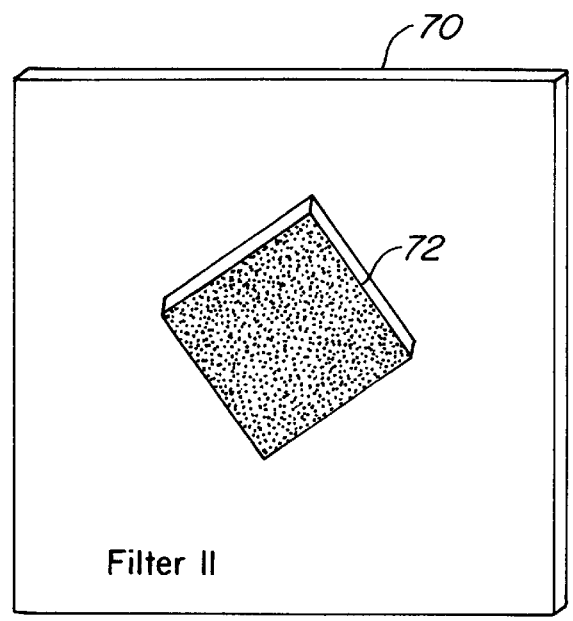
Figure 6C:
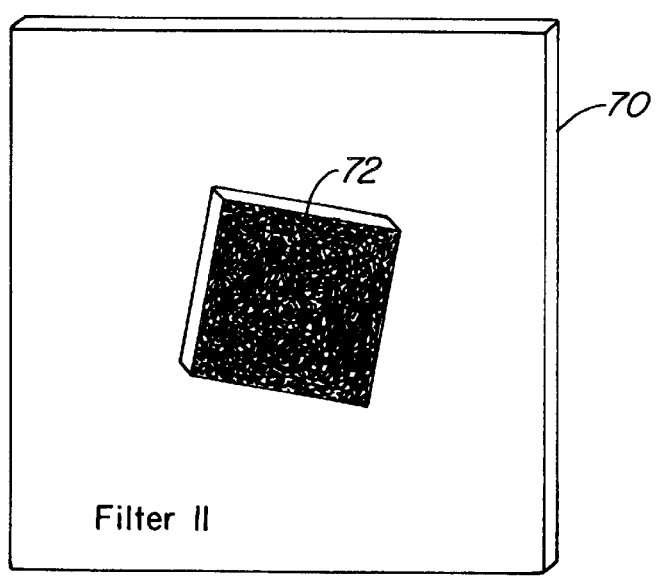

FIGS. 6A–6C illustrate the amount of light penetrating through the two filters of the embodiments of the invention. As shown in FIG. 6A, the stationary filter 70 is aligned with a rotating filter 72. In the orientation of FIG. 6A, a maximum amount of light penetrates the two filters. As shown in FIG. 6B, filter 72 is slightly rotated, decreasing the amount of light penetrating and thus darkening the image of filter 72. FIG. 6 shows filter 72 rotated to almost a 90° orientation with respect to that of FIG. 6A, and thus almost no light penetrates, making the combination of filter 72 and filter 70 very dark or essentially opaque in FIG. 6C.

The sensor of the present invention is an absolute sensor for angles less than 90°. For beyond 90°, it produces a relative sensor, and thus the sensor can be a combination of relative and absolute modes. In addition, the input signal from the photodetector can be used to provide a speed indication. With appropriate sensitivity, the sensor can be used for absolute sensors in pointing devices.

As will be understood by those of skill in the art, the present invention may be embodied in other specific forms without departing from the spirit or essential characteristics thereof. Accordingly, the foregoing description is intended to be illustrative, but not limiting, of the scope of the invention which is set forth in the following claims.

What is claimed is:

1. A computer input device having an encoder, said encoder comprising:

a movable element for providing an input to a host computer, wherein said movable element is responsive to a movement of said input device by an operator of said host computer;

a first polarized filter coupled to said movable element so that said first polarized filter moves proportionately to said movable element;

a second, stationary polarized filter adjacent said first polarized filter;

a photoemitter mounted on a first side of said first and second polarized filters; and a first photodetector mounted on a second side of said first and second polarized filters, said first photodetector providing a signal proportional to an amount of movement of said movable element, such that the relative positions of said first and second polarized filters provides a modulated light to said first photo detector thus providing an indication of a relative movement of said input device.

2. The encoder of claim 1 where said movable element is coupled to a joystick handle.

3. The encoder of claim 1 wherein said first polarized filter moves in a rotational manner.

4. The encoder of claim 1 further comprising:

a third polarized filter mounted adjacent said first and second polarized filters, said third polarized filter being phase-shifted with respect to said second polarized filter;

a second photo detector mounted to receive light passing through said first and third polarized filters; and a differential detection circuit configured to provide a signal corresponding to the difference between signals from said first and second photodetectors.

5. The encoder of claim 4 wherein said third polarized filter is phase shifted 90 degrees with respect to said second polarized filter.

6. The encoder of claim 1 wherein said movable element is an element of an input device for a computer.

7. The encoder of claim 6 wherein said movable element is coupled to a ball of a mouse or trackball.

* * * * *